United States Patent [19]

Boehringer

[11] Patent Number: 4,738,282
[45] Date of Patent: Apr. 19, 1988

[54] ZERO LEAKAGE VALVE

[75] Inventor: Wilfred E. Boehringer, Fullerton, Calif.

[73] Assignee: McDonnell Douglas Corporation, Long Beach, Calif.

[21] Appl. No.: 936,915

[22] Filed: Nov. 26, 1986

Related U.S. Application Data

[63] Continuation of Ser. No. 306,520, Sep. 28, 1981, abandoned.

[51] Int. Cl.[4] .................... F16K 15/18; F16K 31/363
[52] U.S. Cl. ...................... 137/503; 137/509; 137/512.3; 137/630.22; 251/63.4; 251/63.5; 251/210; 251/900
[58] Field of Search .............. 137/512, 512.3, 522, 137/628, 630.14, 630.19, 630.22, 494, 503, 509; 251/62, 63.4, 63.5, 82, 210, 211, 900

[56] References Cited

U.S. PATENT DOCUMENTS

| | | | |
|---|---|---|---|
| 1,834,276 | 12/1931 | Hallett | 251/82 |
| 2,271,274 | 1/1942 | O'Donnell | 251/82 |
| 3,092,135 | 6/1963 | Brown et al. | 251/62 |
| 3,391,897 | 7/1968 | Wilson | 137/495 |
| 3,951,381 | 4/1976 | Whitener | 251/DIG. 1 |
| 4,013,093 | 3/1977 | Pensa | 137/493 |
| 4,172,469 | 10/1979 | Boehringer | 137/512.3 |

Primary Examiner—Alan Cohan
Assistant Examiner—John Rivell
Attorney, Agent, or Firm—P. T. Loef; G. W. Finch; J. P. Scholl

[57] ABSTRACT

A valve having dual seats and dual poppets operating in series to function as either a conventional check valve, or may be operated by an independent piston which may be styled to either combine or eliminate the check valve feature. One seat poppet combination employs a metal-to-metal seal. The other seat poppet combination utilizes a resilient o-ring seal vented so that when the seal is raised from the bottom of its groove, the upstream and downstream sides of the soft seat poppet can communicate. Alternative embodiments provide a family of zero leakage valves for different purposes, e.g. a check valve, pilot operated check valve, and an in line or balanced relief valve with or without the check valve feature by employing generally the same elements with modifications.

11 Claims, 3 Drawing Sheets

ZERO LEAKAGE VALVE

This is a continuation of application Ser. No. 306,520, filed Sept. 1981, now abandonded.

BACKGROUND OF THE INVENTION

This invention relates to zero leakage valves, and more particularly to zero leakage valves employing dual seats and dual poppets wherein one set relies on a metal-to-metal or hard seal and the other seat relies on a resilient or soft seal when the valve is operable by independent means even though it may function as a conventional check valve as well.

The basic valve closure components are shown and described in U.S. Pat. No. 4,172,469 entitled "Soft Seat Check Valve," issued to the same inventor and assigned to the same assignee as this application, the disclosure of which is hereby incorporated by reference.

As explained in the reference, zero leakage is achieved by employing a double seat and poppet arrangement operating in series. One seat poppet combination utilizes a resilient sealing means and the other seat poppet combination employs a metal-to-metal seal. Successful operation of the valve requires that the hard seat always closes first and opens last so that the resilient seal seat always opens and closes at essentially zero fluid flow. This feature is readily accomplished in the conventional check valve application where the downstream pressure is always slightly higher when the valve closes and the upstream pressure is slightly higher when the valve opens, and in both opening and closing the differential pressures are quite small. However, where the valve closure components are operated by an independent means, e.g. a piston, the relative pressures may be reversed and the differential pressures may be very high. When the differential pressure is high and the higher pressure is on the side of the poppet which tends to close the poppet in the conventional check valve, the reaction of opening the soft seat poppet is as shown in FIG. 3. When the soft seat poppet is forced to open, the o-ring is pulled out of its groove by the pressure that has slowly leaked across the hard seat poppet. Even though full differential pressure is seen across the soft seat poppet, it always opens and closes under essentially no flow. The resilient seal is pulled from its groove by the differential pressure which forces the seal to stay in engagement with the poppet seat and a side of the o-ring groove. Once the resilient o-ring seal is extruded from its groove, it will be damaged or lost and can no longer function as a zero leakage valve.

SUMMARY OF THE PRESENT INVENTION

It is an important object of the present invention to provide a valve having a double seat and poppet arrangement operating in series which may be actuated by an independent means, under high differential pressures acting across the poppets and functions with zero leakage.

It is a further object of the present invention that the valve may function as either a conventional check valve or may be operated by an independent piston which may be styled to either combine or eliminate the check valve feature.

It is yet another object of this invention to provide a family of zero leakage valves for different purposes, e.g. a check valve, pilot operated check valve, and an in-line or balanced relief valve with or without the check valve feature by employing, generally, the same elements with modifications.

In summary, the valve of this invention accomplishes the above objects and overcomes the disadvantages of prior devices by providing a double seat and poppet arrangment operating in series. One seat poppet combination employs a metal-to-metal seal. The other seat poppet combination utilizes a resilient or soft sealing means wherein the groove containing the resilient seal is vented so that when the seal is raised from the bottom of its groove the upstream and downstream sides of the soft seal poppet can communicate. This venting relieves the differential pressure across the poppet while the poppet is being opened by an independent means. The signal to operate the independent opening means may come from any source, such as opening another valve in the case of a pilot operated check valve, or may be applied by system pressure in the case of a relief valve or may be manual operation of a linkage.

Typically, when the valve is closed the stem side of the poppet is experiencing the higher pressure. Stem side pressure may be substantially higher than the pressure at the head end of the poppet. The valve is opened by actuating the independent means, which pulls the soft seat poppet from its mating sealing surface and the differential pressure causes the resilient seal to lift off the bottom of its containment groove, opening the relief passage to permit fluid flow across the poppet seat, eliminating the differential pressure. When the differential pressures across the poppet are such that the higher pressure is at the head end of the poppet or the pressure is near neutral, the soft seal seats against the bottom of the groove closing off and sealing the vent passage. This action provides a zero leakage seal wherein the soft seat valve does not extrude from its containment groove with any type of differential pressure applied across the poppet.

BRIEF DESCRIPTION OF THE DRAWINGS

With reference to the drawings, wherein like reference numerals designate like portions of the invention.

DETAILED DESCRIPTION OF THE PREFERRED EMBODIMENT

Figure 1:
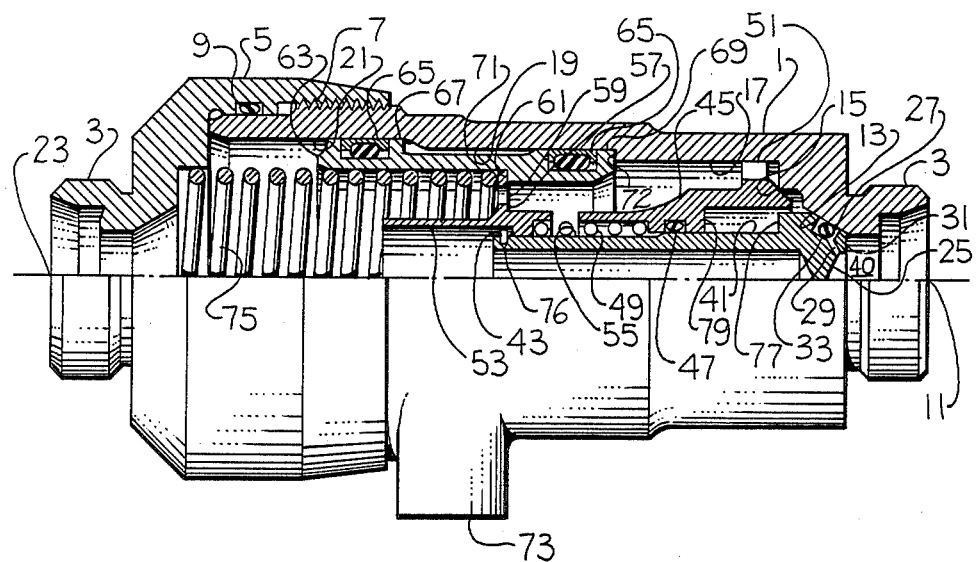
FIG. 1 is a half sectional view of a dual seat check valve which may be opened by a pilot operated piston.

FIG. 1 is an embodiment of the present invention which constitutes a pilot operated check valve. The male body 1 terminates on one end in an external fitting 3 for a threaded engagement with a mating part, typically a tube fitting. The other end of the male body 1 threadably engages the female body 5 at 7 with a static o-ring seal 9 to seal the connection. The female body 5 is shown terminating in a fitting 3, similar to that shown for the male body 1.

The inlet bore 11 communicates with a soft poppet seat 13, followed by the hard poppet seat 15, followed by first, second and third steps at 17, 19 and 21, respectively, terminating in an outlet port at 23. The soft seat poppet 25 contains an o-ring groove at 27 with a vent passage 29 connecting the o-ring groove 27 to the chamber at the head end 31 of the soft seat poppet 25. The resilient seal is shown as an o-ring 33 contained in the o-ring groove 27 which has two opposing sides 35 and a bottom surface 37 (See FIG. 2). The location of the vent passage 29 is critical in the sense that the o-ring 33 must seal the vent passage 29 when the seal is in the normal position as well as provide an open communication passage between the chambers 39 and 40 when the o-ring is raised from the groove bottom surface 37 by fluid pressure so as to eliminate the delta pressure across the seal 33. Soft seat poppet 25 terminates in a stepped stem 41 having a snap ring 43, to act as a shoulder, at the far end.

The hard seat poppet 45 circumferentially envelopes the soft seat poppet 25 and is sealed by the o-ring seal 47 which slideably engages the stem 41 of the soft seat poppet 25. The hard seat poppet 45 is biased so as to engage the hard poppet seat 15 by the biasing spring 49 to make certain that the hard seat poppet always engages its seat first when the check valve closes, and opens last, both in respect to the soft seat poppet 25. This is essential for proper functioning of the valve as discussed supra. The outside diameter of the hard seat poppet 45 is circumferentially intermittent as shown at 51 so as to allow fluid flow to the hard seat as well as provide guidance against the first step diameter 17 of the male body 1.

The other end of the biasing spring 49 engages a carrier sleeve 53 whose inside diameter slideably engages the clearance diameter 55 on the stem portion 41 of the soft seat poppet 25. Carrier sleeve 53 is provided with a flange at 57 which is perforated at 59 to provide fluid flow passage while the outer portion of the flange 57 engages a shoulder 61 which is provided on the inside bore of the differential pilot piston 63. The combination of a slipper seal and o-ring is shown at 65 to seal both the large diameter 67 and the small diameter 69 of the differential pilot piston 63. Large diameter 67 engages the third step diameter 21 of the bore on the body 1 while the small diameter 69 engages the second stepped diameter 19 of the bore in the male body 1. Circumferential relief 71 is provided between the two diameters in the piston to form a differential piston and cylinder combination with a stop 72 formed by the step in diameter between the bores 17 and 19 limiting the stroke of the differential piston in the direction which allows the poppets 25 and 45 to seat.

Figure 2:
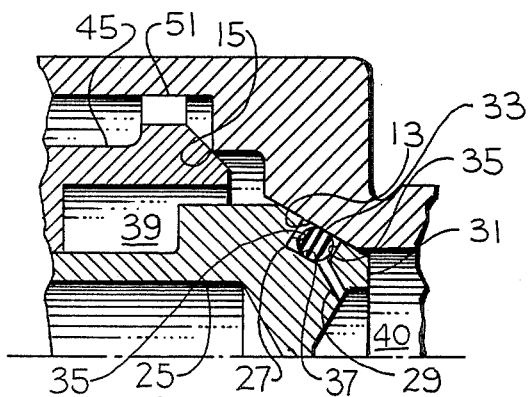
FIG. 2 is an enlarged view of the sectional portion of FIG. 1 showing the portion of the two poppets engaging the seating surfaces in the closed position and showing the vent passage from the o-ring groove.
Figure 3:
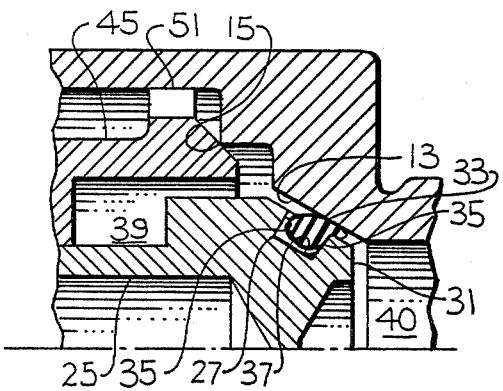
FIG. 3 is an enlargement of a portion of FIG. 1 again showing a portion of the poppets in relationship to the seating surface, with the valve partially open and no vent passage from the o-ring groove, as taught by the prior art.
Figure 4:
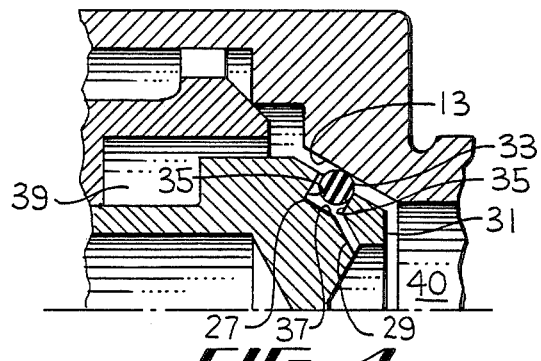
FIG. 4 is the same view as FIG. 3 with the addition of the vent passage from the o-ring groove.

Fluid pressure applied at the internally threaded port 73 fills the relief 71 and reacts against the two diameters 67 and 69 of the differential pilot piston 63. Since the differential piston 67 is larger, the net force is such that the differential piston 63 is moved in the direction of the large diameter or to the left as shown in FIG. 1. As the differential pilot piston 63 moves to the left, it compresses the load spring 75 which engages the outer portion of the flange 57 of the carrier sleeve 53, which in turn engages the shoulder 61 of the differential piston 63. As the combination moves, the carrier sleeve 53 shoulder portion 76, picks up the snap ring 43 which acts as a shoulder on the soft seat poppet 25, unseating the poppet from the soft poppet seat 13. As the soft seat poppet 25 continues to move, the shoulder 77 engages the surface 79 of the hard seat poppet 45 unseating it from the hard poppet seat 5, thus opening the valve. FIGS. 2, 3, and 4 show an enlarged section of the poppets 25 and 45 relative to their seating surfaces 13 and 15. FIGS. 2 and 4 show the poppet action along with that of the resilient seal, which is an o-ring 33, in the closed position and in a position where the poppet is beginning to open, with the vent passage 29 in place. FIG. 3 shows the action of the elastomeric o-ring 33 during the opening phase without the vent passage 29. When the pressure is substantially higher in the chamber 39 than that in chamber 40 and the valve begins to open, the pressure extrudes the o-ring 33 as shown in FIG. 3 if the vent passage is excluded. However, FIG. 4 shows the same o-ring in the same valve position as FIG. 3 with inclusion of the vent passage 29. As can be seen, the differential pressure expands the elastomeric o-ring 33 for raising it from the vent passage 29 and allows fluid flow from chamber 39 to chamber 40, equalizing the pressure and the o-ring does not extrude.

Figure 5:
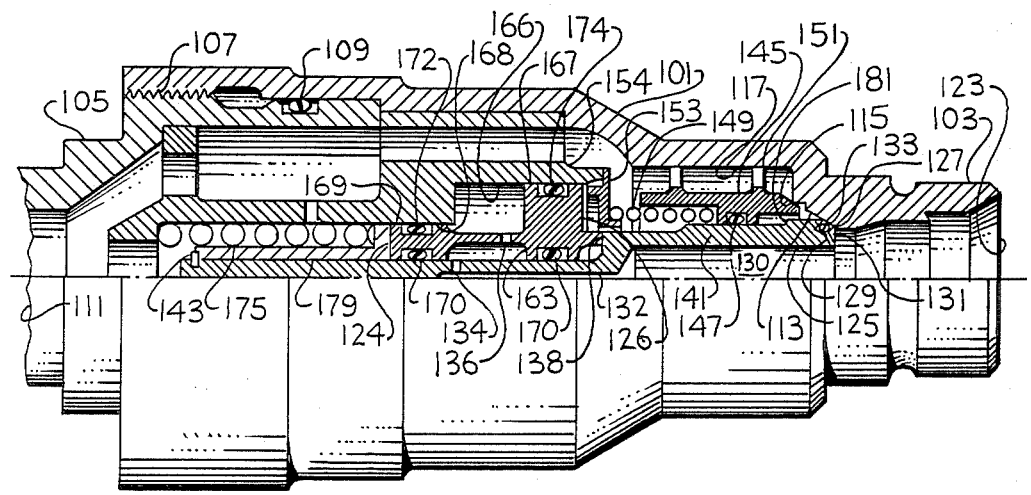
FIG. 5 is a half section view of a dual poppet inline relief valve.

FIG. 1 showed a check valve which could be opened by the application of fluid pressure at the pilot port. FIG. 5 shows an alternative embodiment of the invention where the valve functions as a relief valve which relieves as a function of differential pressure across the valve. The valve body 101 terminates in a threaded fitting 103 at one end and an internal thread at the opposing end which threadably engages the other half of the valve body 105 at 107 and the joint is sealed by an o-ring at 109. The other end of the second half of the valve body 105 also terminates in a threaded fitting 103 which is not shown and contains the inlet port 111. The two parts 101 and 105, making up the valve body, contain a stepped through bore and again contain the soft seat poppet 125 and the hard seat poppet 145. Inside the bore of the body 101 is a soft seat 113 which accommodates the soft seat poppet 125. The head end of the soft seat poppet 125 contains an o-ring groove 127 which in turn contains a resilient seal in the form of an o-ring 133. The o-ring groove 127 has a vent passage 129 which communciates with the bore 130 in the center of the soft seat poppet 125 which in turn communicates with the outlet port 123 of the valve. The hard seat poppet 145 circumferentially envelopes and slideably engages the large diameter of the stem portion 141 of the soft seat poppet 125 and is sealed by the o-ring 147. The hard seat poppet 145 is biased into engagement with the hard poppet seat 115 by the biasing spring 149 and the intermittent outside diameter 151 slideably engages the bore 117 in the body 101. The other end of the biasing spring 149 reacts against the adapter 153 which in turn is reacted by the fixed sleeve 154. The fixed sleeve 154 is provided with adequate porting or relief to permit free axial flow of the fluid through the sleeve. The sleeve 154 functions as a cylinder for the differential piston 163. The large bore 166 in the fixed sleeve 154 accommodates the large diameter 167 of the differential piston 163. The small bore 168 accommodates the small piston 169 of the differential piston. 0-ring seals 170, 172, and 174 are provided to seal the differential piston on its inside and outside diameters.

The downstream pressure, which is the relief side pressure seen at the outlet port 123, communicates through the bore 130 to the stepped bore 132 through the vents 134 and 136 and applies against the inner surfaces of the large diameter piston 167 and the small diameter piston 169. A resulting net force, equal to the difference in the areas times the downstream pressure is applied in the direction to close the softseat poppet 125 as the differential piston bears against the shoulder of the soft seat poppet at 138. Acting to open the relief valve, is the upstream pressure, which is seen at the inlet port 111, applied to the differential area of the outside surfaces 124 and 126 of the differential piston 163 with the net force tending to open the poppet 125 as determined by the difference in the two areas times the upstream pressure. Downstream and upstream pressures, of course, also work against the area of the hard seat poppet as determined by the seat diameter 115. Also, tending to close the poppets 125 and 145 is the load spring 175, which engages the flanged sleeve 179, and in turn bears against the small diameter end of the differential piston 163. Therefore, the sum of these forces, the load spring 175, the differential areas of the inside and outside surfaces of the two pistons of the differential piston 163 times the respective downstream/upstream pressure plus the upstream/downstream differential pressure times the area of the sealed surface of the hard seat poppet 145 as determined by the diameter of the seat 115 act to open or close the soft seat piston 125. When the upstream pressure exceeds the downstream pressure by sufficient differential, the differential piston 163 moves in the direction to open the soft seat poppet 125 and hard seat poppet 145 by compressing the spring 175 and engaging the snap ring 143 at the end of the stem 141 of the soft seat poppet 125. Opening the soft seat poppet, which has a shoulder at 181 which engages the hard seat poppet 145, also opens the hardseat poppet. The seal groove geometry in the head 131 of the soft seat poppet 125 is generally identical to that shown and described in FIGS. 2 and 4 and functions as described supra.

This embodiment produces a relief valve which opens as a function of the differential pressure across the valve.

Figure 6:
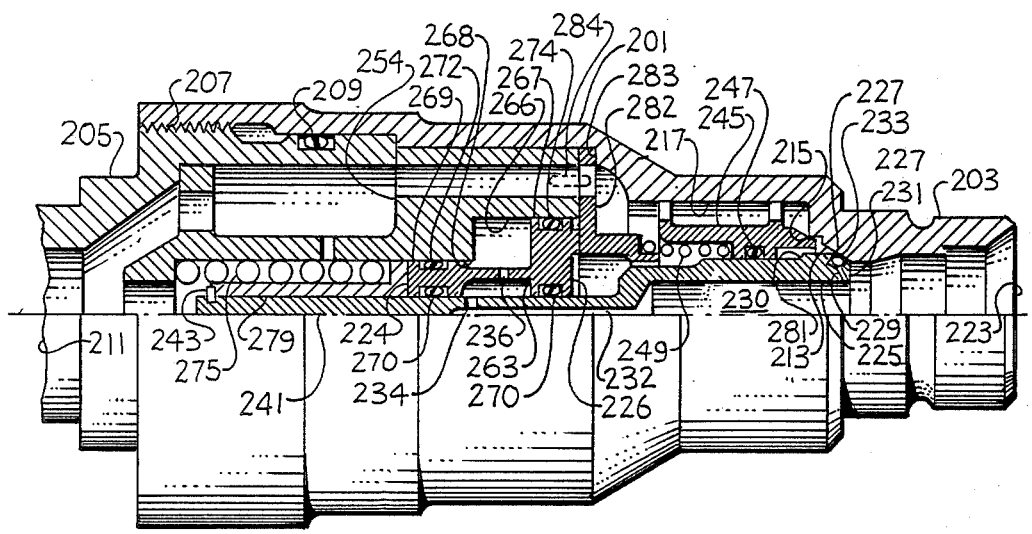
FIG. 6 is a half view of a dual poppet inline relief valve allowing free reverse flow.

The alternative embodiment shown in FIG. 6 is similar to that of FIG. 5 in that it is a soft seat, in-line, relief valve which relieves as a function of differential pressure across the valve. However, in this embodiment the soft seat and hard seat poppets are allowed to function as a conventional check valve and permit free reverse flow.

Components performing similar functions in this embodiment to that described above for FIG. 5 are identified with similar numbers except they are 200 series numbers as opposed to 100 series numbers.

In this embodiment, the differential piston 263 does not act directly on the soft seat poppet 225 but reacts against the sleeve extension 282. The sleeve extension 282 in turn is fixed against the shoulder 283 of the valve body 201 in stacked relationship with the fixed sleeve 254 by the other portion of the valve body 205. The sleeve extension 282 is radially indexed to the fixed sleeve 254 by the indexing pin 284 to ensure that the flow passages between the parts are properly aligned for free flow. It should now be reasonably apparent that the soft seat poppet 225 and the hard seat poppet 245 are seated and unseated by the differential pressure across the valve in check valve fashion. Just as discussed in the embodiment of FIG. 5, downstream pressure applies to the inside surfaces of the differential piston 263 and upstream pressure applies to the external surfaces 224 and 26 of the differential piston 263. As the upstream pressure rises sufficiently high, the differential pistion 263 will move in the direction toward the upstream port 211 engaging the flanged end of the flange sleeve 279, compressing the load spring 275. The end of the flange sleeve 279 engages the snap ring 243 which functions as a shoulder on the soft seat poppet 225, so as to unseat the poppet. As the movement increases, the shoulder 281 of the soft seat poppet 225 engages the hard seat poppet 245 compressing the biasing spring 249 and opening the hard seat poppet.

Figure 7:
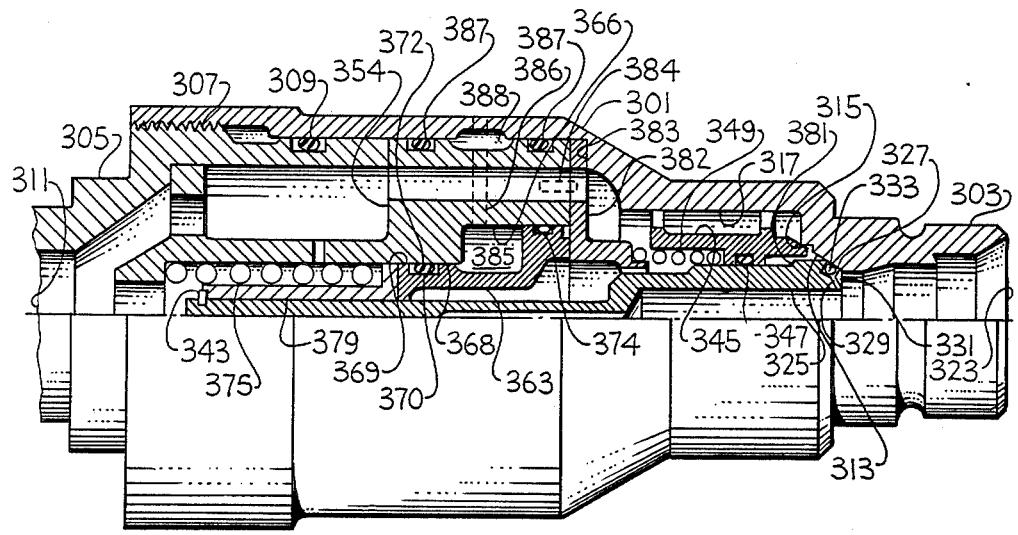
FIG. 7 is a half section view of a balanced relief valve allowing free reverse flow.

A further embodiment of the invention is shown in FIG. 7 which describes a soft seat balanced relief valve with free reverse flow. The relief valve opening is a function of the difference between the upstream pressure on the valve and atmospheric pressure or, in essence, it relieves at a fixed upstream pressure. Again, generally similar parts in the alternative embodiments are identified by similar numbers. The components in this embodiment are numbered in the 300 series.

The soft seat and hard seat poppets 325 and 345 are essentially identical to those shown in the embodiment of FIG. 6. However, no vent holes are provided in the bore of the soft seat poppet stem as upstream pressure is not communicated to any other part of the valve as in the prior embodiment as the valve senses atmospheric pressure. Differential piston 363 is altered substantially from that of the embodiment of FIG. 6. Annular chamber 385 provided between the differential piston 363 and the bores 366 and 368 in the fixed sleeve 354 is vented to the atmosphere by the port 386 shown in hidden lines. Relief space 388 is provided between the two seals 387 to permit multiple ports 386 to communicate to the atmosphere. Since the chamber 385 is vented into the atmosphere, the upstream pressure experienced at the inlet port 311 applies to an effective area represented by the difference in the areas scribed by the two seals 374 and 370. The force produced acts to move the differential piston 363 away from the sleeve extension 382, against the flanged sleeve 379 compressing the spring 375. As the differential piston 363 moves the flanged sleeve 379 moves, which engages the snap ring 343 which is inserted in a groove at the end of the stem 341 of the soft seat poppet 325, moving the poppet from its seat 313. As the soft seat poppet 325 moves, just as in the prior embodiment of FIG. 6, the shoulder 381 engages the hard seat poppet 345 unseating it from its seat 315, opening the relief valve.

It should now be clear that this embodiment describes a relief valve which operates on upstream pressure and permits free reverse flow from the downstream side should the downstream pressure rise above upstream pressure, via the two poppets 325 and 345.

Figure 8:
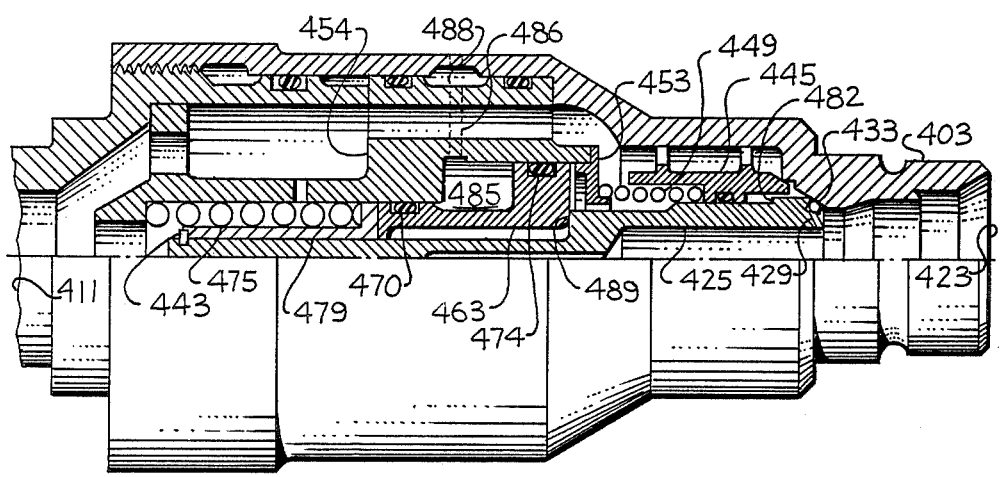
FIG. 8 is a half section view of a soft seat balanced relief valve.

The embodiment of FIG. 8 is very similar to that of FIG. 7 except that it does not have the free reverse flow feature. Again, similar parts are identified with similar numbers and this embodiment is identified by the 400 series. This valve is quite similar to the embodiment described in FIG. 5, except that embodiment senses upstream pressure to control the differential piston while this embodiment senses atmospheric pressure.

The poppets 425 and 445 are similar to those described for the embodiment of FIG. 7, while the carrier sleeve 453 is similar to that of the embodiment of FIG. 5. Differential piston 463 is similar to that of FIG. 7, except that its shape has been modified so that the end of the differential piston bears directly on the soft seat poppet 425 at 489, as it did in FIG. 5. Since the chamber 485 established between the fixed sleeve 454 and the differential pistons 463 is vented to atmosphere via the port 486 the valve functions as that in FIG. 7. The upstream pressure applies against an area represented by the difference in area scribed by the two seals 474 and 470 to move the differential piston 463 against the flange sleeve 479, compressing the load spring 475 and engaging the snap ring 443 to move the soft seat poppet 425. The snap ring 443 again functions only as a shoulder. continued movement of the soft seat poppet 425 forces the shoulder 482 against the hard seat poppet 445 compressing the biasing spring 449 and unseating the hard seat poppet 445.

While the differential pressure upstream and downstream of the poppets works against the effective area of the poppets, this area is relatively small in relationship to the effective area provided by the differential piston 463 and, the load spring 475, the main factor in determining the relief valve setting.

While the present invention has been disclosed in connection with the preferred embodiments thereof, it should be understood that there may be other embodiments which fall within the spirit and scope of the invention defined by the following claims.

What is claimed is:

1. A zero leakage valve comprising:
    a valve body having an inlet port and an outlet port and a flow pasasge bore between said inlet and outlet ports;
    first and second fixed, circular valve seats concentrically arranged and axially located in said bore with said second seat larger than said first seat;
    a first poppet having a head at one end containing a generally retangular groove having a bottom and opposing sidewalls and containing a first resilient sealing means, at least one vent passage in said sidewall nearest said first poppet head end and adjacent said bottom of said groove and communicating to said head end of said first poppet, and a stem, said stem having a cross sectional area essentially equal to the area sealed by said first resilient sealing means in said first poppet head when engaging said first valve seat, axially located in said bore with said head oriented to oppose said first seat;
    support means to slideably support said stem of said first poppet to allow engagement of said first poppet head with said first valve seat;
    a second poppet having a head, oriented to oppose said second seat, and an aperture for slideably receiving said stem of said first poppet, so that said second poppet head may engage said second valve seat;
    second sealing means, between the engaging surfaces of said second poppet and the stem of said first poppet;
    biasing means urging said second poppet head against said second valve seat so that said second poppet unseats after and seats before said first poppet;
    a differential piston and cylinder adapted to axially move said piston responsive to applied pressure;
    a load spring biasing said differential piston in the direction to close said first and second poppets; and
    shoulder means on said stem of said first poppet to unseat said first and said second poppets, sequentially, and simultaneously compress said load spring when said differential piston is actuated so as to open said zero leakage valve.

2. A zero leakage valve as described in claim 1 wherein said differential piston is actuated by applying upstream pressure against one side of said differential piston and downstream pressure against the opposing side of said differential piston so as to function as an in-line relief valve opening on differential pressure across the valve.

3. A zero leakage valve as described in claim 1 wherein said differential piston is actuated by applying upstream pressure againist one side of said differential piston and atmospheric pressure against the opposing side of said differential piston so as to function as a balanced relief valve opening on differential pressure between the upstream side of the valve and atmospheric pressure.

4. A zero leakage valve as described in claim 1 wherein said differential piston includes spaced tandem pistons having different areas, a set of inner piston surfaces and a set of outside piston surfaces.

5. The zero leakage valve of claim 1 further comprising:
    means to stop the travel of said differential piston in the direction to seat said first and second poppets so that said first and second poppets may function as check valves whereby said zero leakage valve may be opened by either differential pressure across said first and second poppets in check valve fashion or movement of said differential piston.

6. A zero leakage valve as described in claim 5 wherein said differential piston is actuated by applying upstream pressure against one side of said differential piston and atmosphereic pressure against the opposing side of said differential piston so as to function as a balanced relief valve opening on differential pressure between the upstream side of the valve and atmospheric pressure while also functioning as a check valve.

7. A zero leakage valve as described in claim 5 wherein said differential piston is actuated by applying upstream pressure against one side of said differential piston and downstream pressure against the opposing side of said differential piston so as to function as an in-line relief valve opening on differential pressure across the valve while also functioning as a check valve.

8. The zero leakage valve of claim 5 wherein said differential piston is actuated by a pilot circuit while also functioning as a check valve.

9. A zero leakage valve comprising:
    a valve body having an inlet port and an outlet port and a flow passage bore between said inlet and outlet ports;
    first and second fixed, circular valve seats concentrically arranged and axially located in said bore with said second seat larger in diameter than said first seat;
    a first poppet having a head at one end containing a generally rectangular groove having a bottom and opposing sidewalls and containing a first resilient sealing means, at least one vent passage located in said sidewall nearest said first poppet head end and adjacent said bottom of said groove and communicating to said head end of said first poppet head, and a stem, said stem having a cross sectional area essentially equal to the area sealed by said first resilient sealing means in said first poppet head when engaging said first valve seat, axially located in said bore with said head oriented to oppose said first seat;

support means, radially restrained and axially movable, to slideably support said stem of said first poppet to allow enggement of said first poppet head with said first valve seat;

a second poppet having a head, oriented to oppose said second seat, and an aperture for slideably receiving said stem of said first poppet, so that said second poppet head may engage said second valve seat;

second sealing means, between the engaging surfaces of said second poppet and the stem of said first poppet;

biasing means urging said second poppet head against said second valve seat so that said second poppet unseats after and seats before said first poppet whereby differential pressure across saids first and second poppets provides a first means to seat and unseat said first and second poppets;

second means to unseat said first poppet and said second poppet further comprising:
a differential piston and cylinder adapted to axially move said piston responsive to applied pressure;
means to stop the travel of said differential piston in the direction to seat said first and second poppets so that said first and second poppets may function as check valves;
means to unseat said first poppet and said second poppet, sequentially, including a removable ring to function as a first shoulder on said stem of said first poppet to engage said differential piston when said differnetial piston is actuated; and
a load spring biasing said differential piston in the direction to close said first and second poppets whereby actuation of said differential piston overrides said load spring and said differential pressure across said first and second poppets to open said first and second poppets.

10. A zero leakage valve as described in claims 9 wherein said second means to unseat said first and second poppets includes actuation of said differential piston by a pilot circuit.

11. A zero leakage valve as described in claim 9 wherein said second means to unseat said first poppet and said second poppet sequentially when said differential piston is actuated further comprising:
a second shoulder inside said axially movable support means, adapted to engage said first shoulder;
a third shoulder inside said differential piston, adapted to engage the outside of said axially moveable support means;
a fourth shoulder on said head end of said first poppet; and
a fifth shoulder on the inside of said second poppet, adapted to engage said fourth shoulder.

* * * * *

UNITED STATES PATENT AND TRADEMARK OFFICE
CERTIFICATE OF CORRECTION

PATENT NO. : 4,738,282
DATED : 19 April 1988
INVENTOR(S) : Wilfred E. Boehringer It is certified that error appears in the above-identified patent and that said Letters Patent is hereby corrected as shown below:

In column 4, line 3, a comma should be placed after the number "43."

In column 4, line 8, the number [5] should be 15.

In column 4, line 8, a new paragraph should begin after the word "valve."

In column 5, line 65, a new paragraph should begin after the word "flow."

In column 6, line 4, the number [26] should be 226.

In column 7, line 13, the word [continued] should be Continued.

In column 8, line 35, the word [atmosphereic] should be atmospheric.

In column 9, line 5, the word [enggement] should be engagement.

In column 9, line 19, the word [saids] should be said.

In column 10, line 5, the word [differnetial] should be differential.

Signed and Sealed this

Fifteenth Day of August, 1989

Attest:

DONALD J. QUIGG

Attesting Officer

Commissioner of Patents and Trademarks